UNITED STATES PATENT OFFICE.

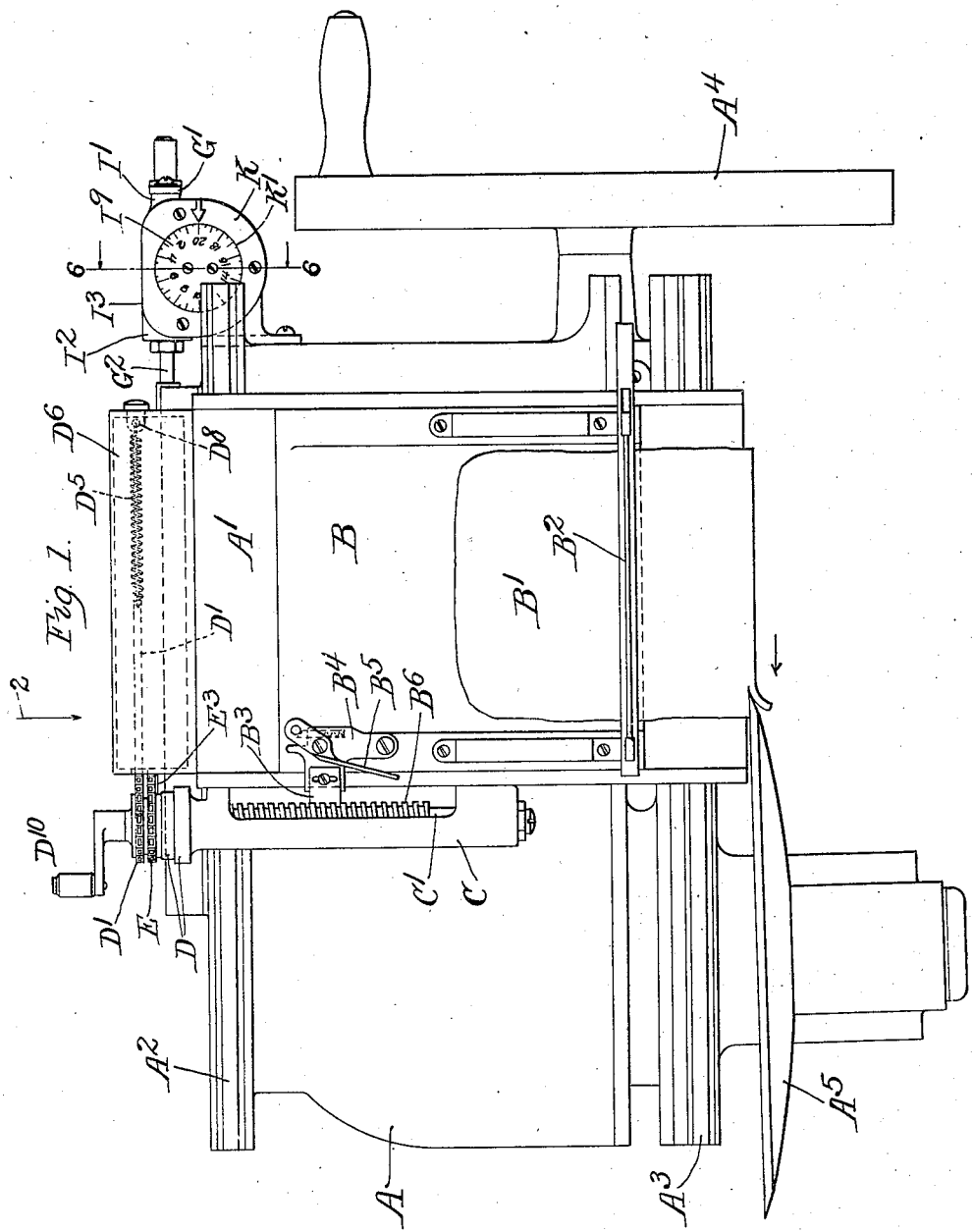

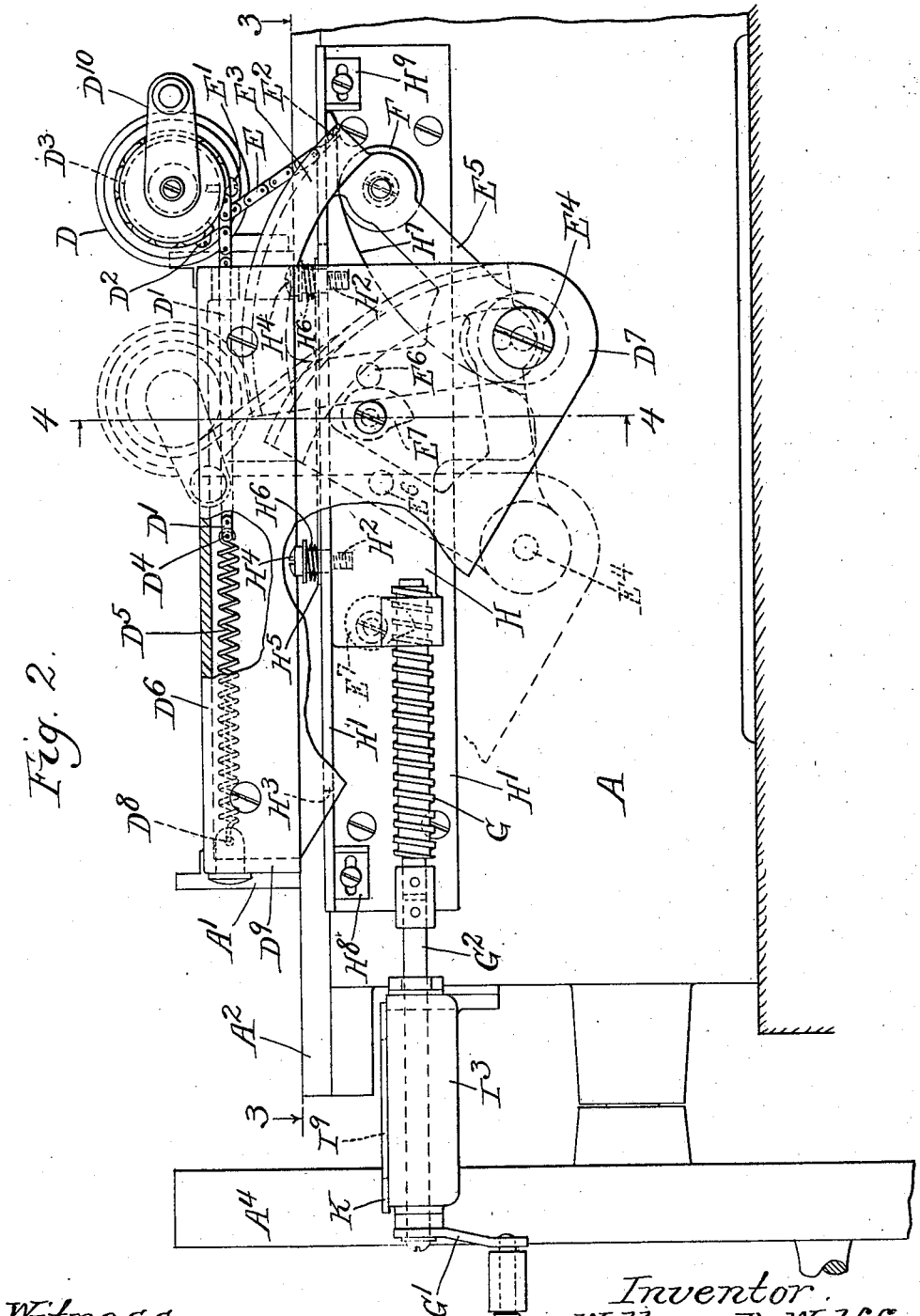

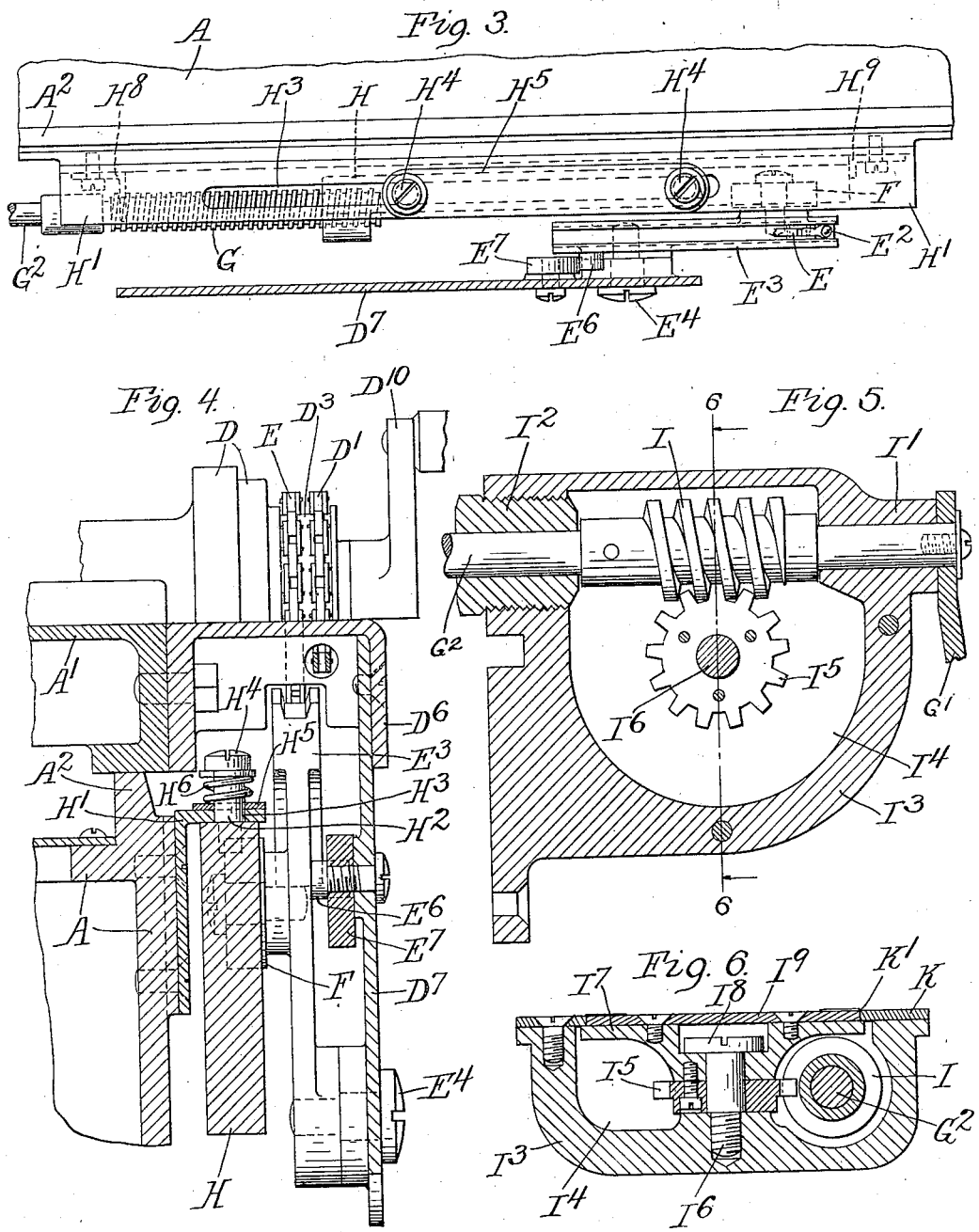

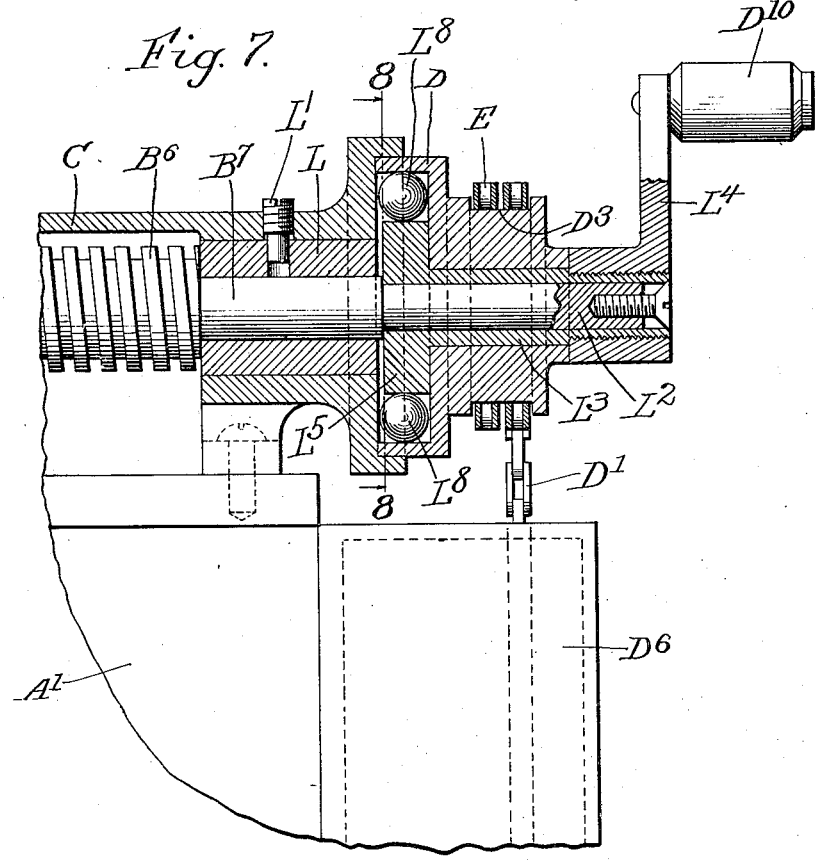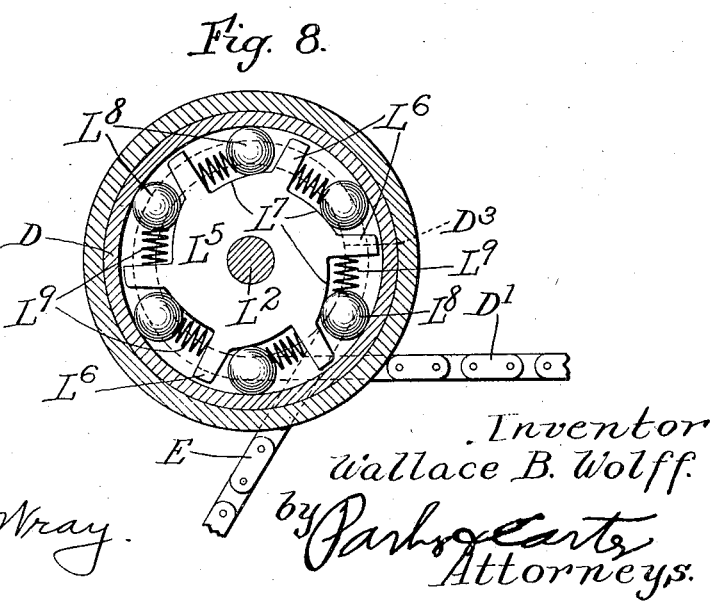

WALLACE B. WOLFF, OF CHICAGO, ILLINOIS.

SLICING-MACHINE.

1,369,153.  Specification of Letters Patent.  Patented Feb. 22, 1921.

Application filed April 15, 1920. Serial No. 374,046.

*To all whom it may concern:*

Be it known that I, WALLACE B. WOLFF, a citizen of the United States, residing at Chicago, in the county of Cook and State of Illinois, have invented a certain new and useful Improvement in Slicing-Machines, of which the following is a specification.

My invention relates to improvements in feed devices for slicing machines, and has for one object to provide a feed device which will feed meat or other substances to be sliced toward the cutting knife. Another object is to advance the meat in response to the reciprocation of the meat carriage. Another object is to provide a device which will adjustably give any desired amount of feed for each reciprocation of the carriage. Another object is to provide a device which can be easily adjusted to vary and control the meat carrying member. Other objects of my invention will appear from time to time in the course of the specification.

My invention is illustrated more or less diagrammatically in the following drawings wherein:

Figure 1 is a plan view of the slicing machine embodying my invention;

Fig. 2 is a side elevation in part section of my device the line of sight being along the line of the arrow 2 of Fig. 1;

Fig. 3 is a vertical section along the line 3—3 of Fig. 2;

Fig. 4 is a vertical section along the line 4—4 of Fig. 2;

Fig. 5 is a detail of the adjustment indicating device illustrated in Fig. 1;

Fig. 6 is a vertical section on the line 6—6 of Fig. 5;

Fig. 7 is a vertical section of a part of the feed screw shaft mounting.

Fig. 8 is a vertical section on lines 8—8 of Fig. 7.

Like parts are indicated by like characters throughout the several drawings. A is a slicing frame. The carriage $A^1$ is adapted to reciprocate along the tracks $A^2$, $A^3$ being driven by any suitable means in response to the rotation of the drive wheel $A^4$. $A^5$ is the cutting knife rotated by any suitable driving means not shown in response to the rotation of the drive wheel $A^4$.

B is a meat plate adapted to slide along the carriage $A^1$ toward the knife. It carries a piece of meat $B^1$ held by the clamp $B^2$. $B^3$ is a nut mounted on the lever $B^4$ controlled by the thumb piece $B^5$ so that it may be thrust into or out of engagement with the feed screw $B^6$ which screw is mounted for rotation on the carriage $A^1$.

C is a cylindrical housing for the feed screw $B^6$ open as at $C^1$ to permit movement of the nut $B^3$ along the screw and still afford substantial protection for the screw.

D is a one way clutch drum or ratchet controlling the screw $B^6$ having within it any suitable means for rotating clutch parts not shown and the screw $B^6$ controlled thereby, in response to rotation of the drum in one direction, but freely permitting rotation of the drum without rotating the screw in the opposite direction. $D^1$ is a chain, one end anchored at $D^2$ in the channel $D^3$ of the drum, the other end secured as at $D^4$ to a spring $D^5$ which lies within a housing $D^6$ secured on the end of the carriage $A^1$, and has the depending part $D^7$ which overhangs the side of the frame, A, which presents an open end in the direction of the drum. The spring $D^5$ is secured by any suitable means at $D^8$ to the opposite closed end $D^9$ of said housing. $D^{10}$ is a hand crank keyed to the clutch D. E is a second chain secured as at $E^1$ to the periphery of the drum, within its channel, its opposite end secured as at $E^2$ to a segment $E^3$ pivoted at $E^4$ to the downward projection $D^7$ of the carriage $A^1$. One arm $E^5$ of the segment carries adjacent the point of securing of the chain a roller F whose purpose will later appear. $E^6$ is a stop on the segment $E^3$ adapted to contact the cam shaped stop $E^7$ which is adjustably mounted on part $D^7$. The stops $E^6$ and $E^7$ coöperate to limit the rotation of the segment.

G is an adjustment screw mounted for rotation in any suitable manner adapted to be operated by a hand crank $G^1$ connected to it by a shaft $G^2$. The free end of the screw G rotatably meshes with and penetrates a depending stop or cam H slidably supported by any suitable means on an angle iron $H^1$ secured to the framework A of the slicing machine.

In my preferred form I illustrate the cam as slidably secured to the lower side of said angle iron $H^1$ by means of a plurality of screws or stops $H^2$ which penetrate a slot $H^3$ in the horizontal surface of said angle iron. Between the enlarged heads $H^4$ of the screws and a plate $H^5$ which rides on the top of the angle iron, are the compression springs H⁶ which serve to hold the depending cam in close but slidable engagement with the lower surface of the angle member. Secured to the angle iron H¹ are the adjustable stops H⁸, H⁹ whose purpose will later appear.

The forward face of the cam H opposite its engagement by the screw G, is shaped to form an arcuate, concave runway H⁷ lying in the same vertical plane and adapted to be engaged by the roller F on the segment E³. The screw G and the cam H lie within the depending edge D⁷ of the carriage A¹ to which the segment E³ is pivoted.

The hand crank G¹ which controls the screw G is keyed to a worm I, rotating in the bearings I¹, I², of the housing I³. Rotating on a vertical axis in the open space I⁴ of said housing is a pinion I⁵ in mesh with said worm and secured in place by a pivot screw I⁶. Keyed to the pinion and rotating about said screw is a plate I⁷, its center sunk to receive the enlarged head I⁸ of the screw I⁶. Secured to the top of said plate is the indicating dial I⁹ completely filling a circular opening K¹ in the plate K which forms the top of said housing.

Although I have illustrated in my drawings an operative device, it may be obvious that many changes both in form, size and arrangement of parts may be made without departing from the spirit of my invention, and I wish therefore that my drawings be taken as in a sense diagrammatic.

Where in the specifications and claims I have used the expression meat "plate," I mean of course that plate which supports the material that is being cut, and I of course do not limit myself to a plate which will carry meat, as my machine may be used equally well in slicing a large variety of materials.

The means for reciprocating the meat plate comprise a crank, a connecting rod and a train of gears and is driven by a power wheel A⁴. This arrangement is not shown as it is not part of the present invention which is directed primarily toward a mechanism which may be applied to any reciprocating plate slicing machine irrespective of the manner or means of producing such reciprocation.

Figs. 7 and 8 illustrate in detail the structure of the clutch drum or ratchet D. The member D contains the bearing L for the shaft B⁷ which carries the feed screw. This sleeve is held in position by the set screw L¹. L² is an extension projecting from the end of the feed screw, supporting the shaft on which is mounted a sleeve L³ carrying at one end the handle L⁴, and at the other end a clutch plate L⁵. The clutch plate L⁵ has fingers L⁶ L⁶ interposed between cam surfaces L⁷ L⁷, balls L⁸ L⁸ adapted to roll along these cam surfaces being forced yieldingly toward the outer ends thereof by springs L⁹ L⁹, abutting against the fingers L⁶.

The use and operation of my invention are as follows:

The meat plate is placed on the meat carriage so that it may slide therealong. The nut by manipulation of the lever is thrown in engagement with the feed screw. The meat is then placed on the meat plate and locked in position by the clamp. The operator then rotates the drive wheel causing a reciprocation of the meat carriage back and forth toward and from the knife. Meanwhile the knife is rotated so that as the meat is fed toward it, a slice may be cut off. It is necessary of course that upon each reciprocation of the meat plate, the meat be fed forward a certain distance equal to the thickness of the slices. This feed is caused by a progressive rotation of the feed screw B⁶.

By referring to Fig. 2, it will become evident that as the carriage is moved to the left, after the meat cutting excursion, the roller on the segment will engage the concave face of the cam H. As the meat plate continues its excursion, the roller will ride down the cam, and the segment will be rotated to the position shown in the dotted lines of Fig. 2. By this movement, the segment will pull down the outer end of the chain E, and will thus rotate the drum D, and with it the feed screw. The meat or other substance to be cut will be advanced by the feed screw and the nut controlled thereby, toward the knife, in preparation for the next cutting excursion. By rotation of the crank G¹ and the screw G the cam can be withdrawn toward the left, thus shortening the arc through which the segment rotates, and the amount of rotation of the screw. The thickness of the slice cut, is thus positively controlled by the operator, and is indicated on the dial face controlled by the rotation of the screw G.

When a new cutting excursion is begun and the carriage plate returns to the right of the machine, the roller rides up the cam, the segment returns to upright position, and the chain E is wound back on the drum D by the action of the spring on the chain D¹. This rotation of the drum has no effect on the adjusting screw, since the clutch D is a one way clutch, and does not control the feed screw during this return rotation.

The excursion of the cam is limited by the stops H⁸, H⁹ which may be slightly adjusted, if necessary.

The feed screw is further manually controlled by the hand crank D¹⁰ by which the meat can be advanced toward the knife, regardless of the automatic feed.

I claim:

1. In a slicing machine, a cutting means, a reciprocating carrying member, a member mounted for rotation on said carrying member and adapted by its rotation to advance said carrying member progressively toward said cutting means a stop on said machine adapted to be contacted by and to rotate said rotatably mounted member in response to the reciprocation of said carrying member, said stop cam shaped and adapted to distribute the blow of said contact over a period of time, the face of that portion of said cam which first comes in contact with said rotatable member lies parallel to the path of reciprocation of said carrying member.

2. The combination of a reciprocating member, a segment pivoted on said member, a rotatable element mounted on said reciprocating member, a drum rotatably mounted on said element and means for rotating said element in response to such reciprocation, said means comprising a ratchet interposed between said drum and said rotatable element, a chain about said drum and secured at one end to it, said chain secured at its other end to said segment and a stop adapted to contact said segment and rotate it.

3. In a slicing machine, a reciprocating member, a rotatable element mounted on said reciprocating member, a segment mounted for rotation on said reciprocating member, a slidably adjustable cam mounted on said machine and adapted to be contacted by and to rotate said segment, a flexible connection between said segment and said element adapted to cause said element to rotate in response to the rotation of said segment.

4. In a slicing machine comprising a cutting member and a reciprocating carrying member adapted to be moved progressively toward the cutting member in response to the rotation of a feed screw, means for rotating said screw comprising an adjustable cam mounted on said machine, a segment mounted for rotation on said carrying member, and adapted to contact said cam and to be thus rotated, a chain on said segment secured to said feed screw and adapted through a clutch to rotate said screw in response to the rotation of said segment, a spring on said carrying member, a second chain secured at one end to said spring and at its other end to said screw and adapted to resist rotation of said segment.

5. In a slicing machine comprising a cutting member and a reciprocating carrying member adapted to be moved progressively toward the cutting member in response to the rotation of a feed screw, means for rotating said screw comprising an adjustable cam mounted on said machine, a segment mounted for rotation on said carrying member and adapted to contact said cam and to be thus rotated, a roller on said segment, a chain on said segment secured to said feed screw and adapted through a clutch to rotate said screw in response to the rotation of said segment, a spring on said carrying member, a second chain secured at one end to said spring and at its other end to said screw and adapted to resist rotation of said segment.

6. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and a stop on said machine adapted to be contacted by and to rotate said segment.

7. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and a stop on said machine adapted to be contacted by and to rotate said segment, said stop so shaped as to distribute the blow from said contact over a period of time.

8. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it, including a segment mounted for rotation on said plate, two chains oppositely wound about said screw, each secured at one end to it, one yieldingly attached at its other end to said plate, the other chain secured at its other end to said segment and a stop on said machine adapted to be contacted by and to rotate said segment, said stop cam shaped and adapted to progressively rotate said segment.

9. In a slicing machine, a cutting means, a plate, mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, said segment carrying a roller, two chains oppositely wound about said screw, each secured at one end to it, one yieldingly attached at its other end to said plate, the other chain secured at its other end to said segment, and a stop on said machine adapted to be contacted by said roller and to rotate said segment.

10. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment carrying a roller and mounted for rotation on said plate, two chains oppositely wound about said screw, each secured at one end to it, one yieldingly attached at its other end to said plate, the other chain secured at its other end to said segment and a stop on said machine adapted to be contacted by said roller and to rotate said segment, said stop so shaped as to distribute the blow from said contact over a period of time.

11. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it, including a segment carrying a roller and mounted for rotation on said plate, two chains oppositely wound about said screw, each secured at one end to it, one yieldingly attached at its other end to said plate, the other chain secured at its other end to said segment and a stop on said machine adapted to be contacted by said roller said stop cam shaped and adapted to progressively rotate said segment.

12. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment carrying a roller and mounted for rotation on said plate, two chains oppositely wound about said screw, each secured at one end to it, one attached at its other end to said plate, the other chain secured at its other end to said segment, and a stop on said machine adapted to be contacted by said roller and to rotate said segment, said stop so shaped as to distribute the blow from said contact over a period of time.

13. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it, including a segment carrying a roller and mounted for rotation on said plate, two chains oppositely wound about said screw, each secured at one end to it, one attached at its other end to said plate, the other chain secured at its other end to said segment and a stop on said machine adapted to be contacted by said roller, said stop cam shaped and adapted to progressively rotate said segment.

14. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and an adjustable stop on said machine adapted to be contacted by and to rotate said segment.

15. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and an adjustable stop on said machine adapted to be contacted by said segment and to rotate said segment, said stop so shaped as to distribute the blow from said contact over a period of time.

16. In a slicing machine, a cutting means, a plate mounted on said machine and adapted to be reciprocated thereacross and to bring the material which it is adapted to carry into and out of the path of said cutting means, means for advancing said plate toward said cutting means, in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment and an adjustable stop on said machine adapted to be contacted by said segment, said stop cam shaped and adapted to progressively rotate said segment.

17. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and an adjustable stop on said machine adapted to be contacted by said segment said adjustable stop adapted by means of its adjustment to vary the rotation of said feed screw and the thickness of slice cut with each reciprocation of said plate.

18. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and an adjustable stop on said machine adapted to be contacted by said segment and to rotate said segment, said stop so shaped as to distribute the blow from said contact over a period of time, said adjustable stop adapted by means of its adjustment to vary the amount of rotation of said feed screw and the thickness of slice cut with each reciprocation of said plate.

19. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment and an adjustable stop on said machine adapted to be contacted by said segment, said stop cam shaped and adapted to progressively rotate said segment, said adjustable stop adapted by means of its adjustment to vary the amount of rotation of said feed screw and the thickness of slice cut with each reciprocation of said plate.

20. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and an adjustable stop on said machine adapted to be contacted and to rotate said segment, said adjustable stop adapted by means of its adjustment to vary the amount of rotation of said feed screw and the thickness of slice cut with each reciprocation of said plate, and a dial connected to said stop and adapted to indicate the thickness of slice to be cut at any setting of said stop.

21. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and an adjustable stop on said machine adapted to be contacted by said stop, said stop so shaped as to distribute the blow from said contact over a period of time, and adapted by means of its adjustment to vary the amount of rotation of said feed screw and the thickness of slice cut with each reciprocation of said plate, and a dial connected to said stop and adapted to indicate the thickness of slice to be cut at any setting of said stop.

22. In a slicing machine, a cutting means, a plate mounted on said machine and adapted to be reciprocated thereacross and to bring the material which it is adapted to carry into and out of the path of said cutting means, means for advancing said plate toward said cutting means in response to said reciprocation, said means comprising a feed screw, means for rotating it including a segment mounted for rotation on said plate, two chains oppositely wound about said screw, each secured at one end to it, one yieldingly attached at its other end to said plate, the other chain secured at its other end to said segment, and an adjustable stop on said machine adapted to be contacted by said segment, said stop cam shaped and adapted to progressively rotate said segment and adapted by means of its adjustment to vary the rotation of said feed screw and the thickness of slice cut with each reciprocation of said plate, and a dial connected to said stop and adapted to indicate the thickness of slice to be cut at any setting of said stop.

23. In a slicing machine a cutting means, a reciprocating carrying plate, means for reciprocating said plate, a feed screw for advancing said plate progressively toward said cutting means, means for rotating said screw in response to the reciprocation of said plate, said means including a segment mounted for rotation on said plate, a roller in said segment, a cam adjustably mounted on said machine, said roller adapted to contact the face of said cam, a portion of the face of said cam being parallel to the path of said roller, a flexible connection between said cam and said feed screw whereby said feed screw is rotated in response to the rotation of said segment, a flexible connection connected at one end to said feed screw, and at its other end to a spring mounted on said plate and adapted to resist the rotation of said segment and to return it to neutral when said segment is free to return.

24. In a slicing machine, a reciprocating member, a rotatable element mounted thereon, a lever mounted for rotation on the reciprocating member, a cam adapted to be contacted by and to rotate said lever, a flexible connection between said lever and said rotatable element adapted to cause said element to rotate in response to the rotation of said lever.

25. In a slicing machine, a reciprocating member, a rotatable element mounted thereon, a lever mounted for rotation on the reciprocating member, a slidably adjustable cam adapted to be contacted by and to rotate said lever, a flexible connection between said lever and said rotatable element adapted to cause said element to rotate in response to the rotation of said lever.

26. In a slicing machine, a reciprocating member, a rotatable element mounted on said reciprocating member, a rocking member pivoted thereon, a cam adapted to be contacted by and to rotate said rocking member, a flexible connection between said rocking member and said rotatable element adapted to cause said element to rotate in response to the rotation of said rocking member.

27. In a slicing machine, a reciprocating member, a rotatable element mounted on said reciprocating member, a rocking member pivoted thereon, a slidably adjustable cam adapted to be contacted by and to rotate said rocking member, a flexible connection between said rocking member and said rotatable element adapted to cause said element to rotate in response to the rotation of said rocking member.

28. In a slicing machine, a reciprocating member, a rotatable element mounted on said reciprocating member, a rocking member pivoted thereon, both rotatable element and rocking member being separately mounted on the reciprocating member, a cam adapted to be contacted by and to rotate said rocking member, a flexible connection between said rocking member and said element adapted to cause said element to rotate in response to the rotation of said rocking member.

29. In a slicing machine, a reciprocating member, a rotatable element mounted on said reciprocating member, a rocking member pivoted thereon both rotatable element and rocking member being separately mounted on the reciprocating member, a slidably adjustable cam adapted to be contacted by and to rotate said rocking member, a flexible connection between said rocking member and said element adapted to cause said element to rotate in response to the rotation of said rocking member.

Signed at Chicago, county of Cook and State of Illinois, this 5th day of April, 1920.

WALLACE B. WOLFF.